(No Model.) 2 Sheets—Sheet 1.

W. S. GILMORE.
EVAPORATOR.

No. 393,699. Patented Nov. 27, 1888.

WITNESSES.
J. P. Abbott
J. R. Sargint

INVENTOR.
W. S. Gilmore
W. H. Burridge
Atty.

N. PETERS, Photo-Lithographer, Washington, D. C.

UNITED STATES PATENT OFFICE.

WELLER S. GILMORE, OF CHESTER, OHIO.

EVAPORATOR.

SPECIFICATION forming part of Letters Patent No. 393,699, dated November 27, 1888.

Application filed June 4, 1887. Serial No. 240,256. (No model.)

*To all whom it may concern:*

Be it known that I, WELLER S. GILMORE, of Chester, in the county of Geauga and State of Ohio, have invented a certain new and Improved Evaporator; and I do hereby declare that the following is a full, clear, and complete description thereof.

This improved continuous sugar-evaporator is designed more especially for the conversion of maple sirup into sugar.

That the invention may be fully seen and understood reference will be had to the described construction and arrangements of the parts and their conjoint operation, as shown in the annexed drawings, and described in the following specifications connected therewith.

Figure 1:
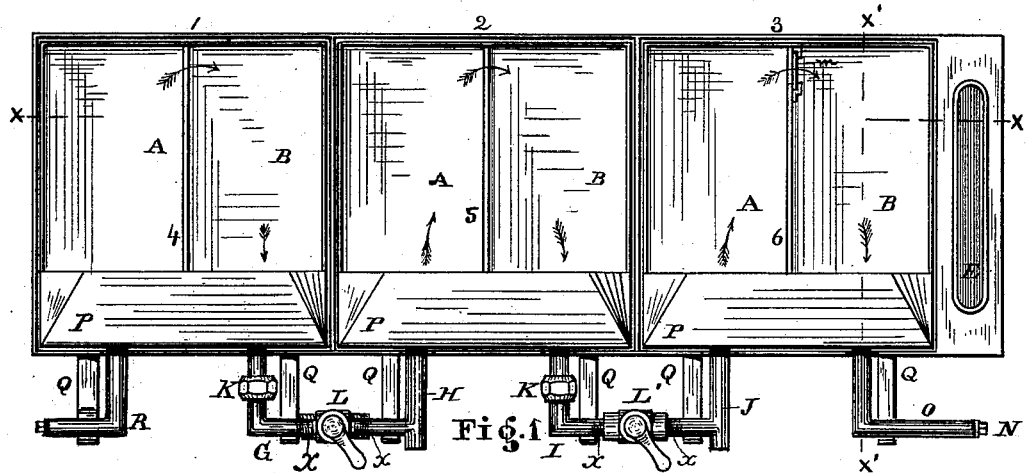
Figure 2:
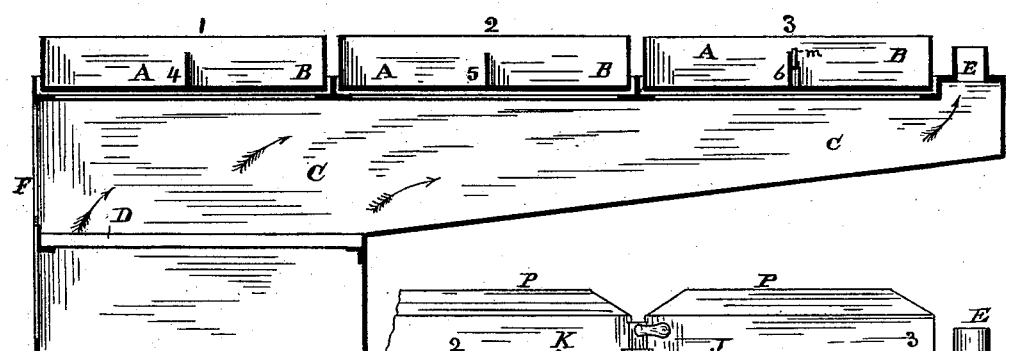
Figure 3:
Figure 4:
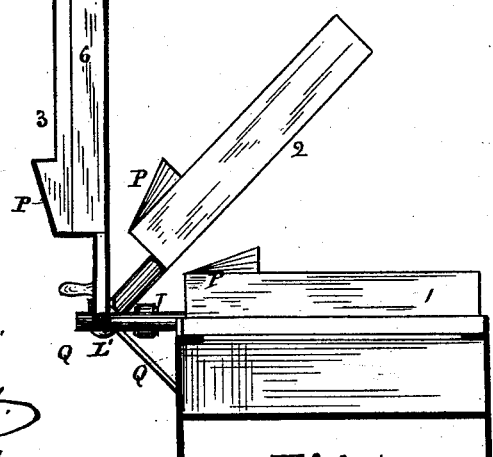
Figure 5:
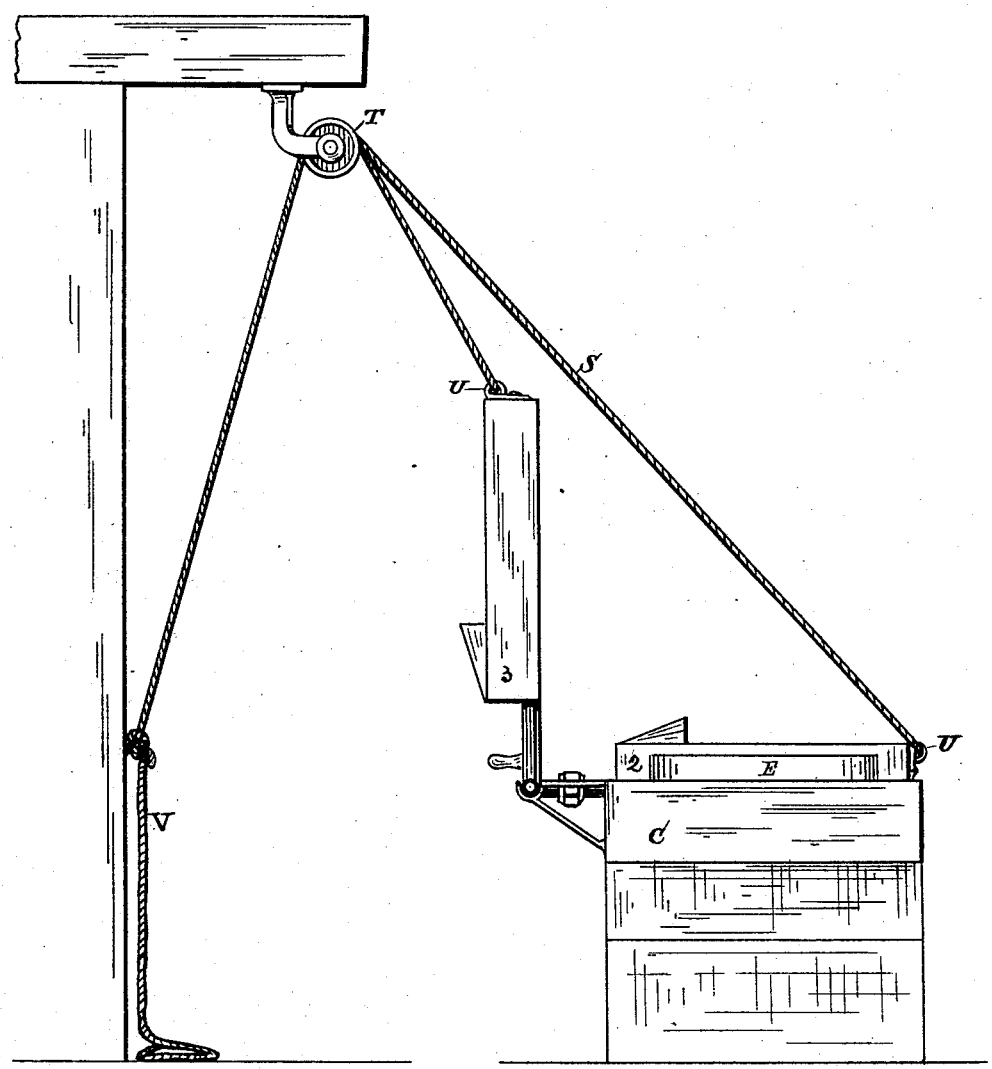

As illustrated in the drawings, Sheet 1, Figure 1 is a plan view; Fig. 2, a longitudinal vertical section in the line $xx$, Fig. 1. Fig. 3 is a side elevation in part. Fig. 4 is a transverse section in the line $x' x'$, Fig. 1. Fig. 5, Sheet 2, is an end view, and represents the means for raising and lowering the pans.

In the specification and drawings like letters represent like parts.

The invention is for the purpose of a continuous evaporation of sap and conversion of the same into sugar. To this end a series of pans, more or less in number, with their attachments, is so arranged in conjoint relation with the furnace that the raw or fresh sap is supplied to the evaporating-pan at one point continuously, so long as it is converted into sirup in a following pan of the series, as hereinafter described.

In the drawings is represented a series of movable pans, 1 2 3, with a partition, 4, 5, and 6, which divides each pan in two parts, A B, Figs. 1 and 2. Directly under the pans is the furnace C, of which D is the grate, E the chimney, and F the door. The furnace is in open and direct contact with the bottom of the pans, as seen in Fig. 2. To the series of pans are connected pipes G H I J, Figs. 1 and 3, which are in open relation with each pan, respectively. The pipes G H are in open connection with the pans 1 and 2, and the pipes I J have the same relation with the pans 2 and 3. The pipes are connected by a union or by a stuffing-box joint at K, and provided with cocks L L', to arrest the flow of sap or juice from one pan to the next.

The maple sap is first received in the division A of pan 1, from which it flows into the part B of pan 1 through an opening in the partition 4 corresponding to that seen at M, Fig. 4. The direction of the sap or liquid from one part of the pan to the other through the opening in the partitions, is indicated by the arrows in Fig. 1. From the pan 1 the liquid or sap goes through the pipes G H into the part or section A of the pan 2, thence through an opening in the partition 5 to the section B. It then flows into the part A of pan 3, through the pipes I J, and from the part A of pan 3 into the part B, through an opening in the partition 6, Fig. 1.

By the means described the sap from its first reception at A in the pan 1 takes a circuitous course through the series of pans to the end. In this transit of the sap or semi-sirup, as the case may be, it is subjected to the heat in the furnace C, which heat passes along under the pans from the front end to the chimney, as indicated by the arrows in Fig. 2, which causes a constant evaporation during the passage of the liquid before mentioned. During this passage of the saccharine liquor, from its inception at A to its termination in the last of the pans, it becomes concentrated by boiling, which expels the water, leaving the saccharine properties in the form of sirup or molasses. The scum and impurities during the boiling rise to the surface, and are skimmed off from the pans in the usual way.

When the sap has passed through the series of pans, as described, and reaches the division B of the pan 3, it is then nearly sirup, and is rendered so by the slide $m$ closing the opening M in the partition 6, and by a further elimination of water by the heat it becomes sirup or molasses. After it has been concentrated to this condition of sirup the plug N, from the discharge-pipe O, Figs. 1 and 3, is withdrawn to allow the sirup to flow off from the division B of pan 3 into a suitable receptacle. When the sirup is drawn off, the closed opening M is then freed for the passage of semi-sirup from A to B of pan 3. The continuous boiling of the sap or juice goes on while it is passing from 1 to 3. On the egress of the liquor from A to B, pan 3, there is a corresponding ingress from the pan 2 into the division A of pan 3 through the pipes I J, and as the liquor flows out from the pan 2 it receives a corresponding inflow from the pan 1 through the pipes G H; hence there is a continuous induction of sap at the first pan proportionate to the discharge of sirup from the last one, as before stated.

In case it is desired to reduce all the sap in the pan 3 to sirup, the cock L' is closed to cut off the passage from the pan 2 to the pan 3, which sap becomes sirup ordinarily in a short time. The pan is then raised or turned from its horizontal position to an angular or vertical one, as indicated by the pans 2 and 3, Fig. 4, in which position the sirup readily flows out of the pan through the pipe O on withdrawing the plug N.

On one end of each pan is a guide or guard, P, Figs. 1 and 4, which, as shown, extends over the end and sides, and is so soldered or otherwise fastened thereto as to be water-tight, forming a sort of funnel, in connection with the pan, to guide the liquor to the pipes and prevent the sirup or liquor from running out over the pan when it is raised up, as shown, thereby causing the sirup to flow out from the pan 3 only through the discharge-pipe O, when the pan is turned up to the position shown at 3' in Fig. 4 on closing the cock L'. The pipes I and J are so fitted to the faucet L' as to form a hinged joint therewith, the pipes G and H being also connected to the cock L in the same way, which admits either of the pipes G, H, I, and J to turn in the faucet as the pans connected with the said pipes, respectively, are raised or turned up and down. The bore of the cocks or faucets longitudinally form sleeves or sockets in which are threaded the connecting-pipes, as shown at $x$, Fig. 1, thereby holding the connection together and admitting their turning according to the said movements of the pans. The arranging or connecting and disconnecting the pans and pipes in relation to the furnace is done by the union-joints K K, as in the ordinary way of coupling and uncoupling. The pans and pipes are supported in the raised or turned positions by means of the brackets Q, which are attached to the sides of the furnace, and on which the pipes rest, as seen in Figs. 1 and 3.

In finishing up—that is, after all the sap at hand is in the several pans, and it is as low or shallow as can be allowed to prevent burning—the pan 3 is then raised up from the furnace to 3', Fig. 4, or in such position as will cause the liquor to flow back from the pan 3 into the pan 2 through the pipes J I, the cock L' being open, and when the pan 3 is emptied of its contents the cock L' is closed to cut off the passage from the pan 2 to 3. The liquor received from the pan 3 into the pan 2, as stated, will flow into the pan 1 through the pipes H G, the cock L being open until there is the same level or amount in the pans 2 and 1.

The semi-sirup remains in the pans 1 2, and when it is reduced by evaporation as low as may be with safety without burning then this pan 2 is also raised up to a point as was the pan 3, or sufficiently to allow of the liquor in the pan 2 to flow out into the pan 1 through the pipes G H, the cock L being open, which cock is again closed to arrest the return of the liquor from the pan 1 to 2. After the liquor is concentrated, forming sirup in the pan 1, it is raised or turned up, as with the pans 2 and 3, to allow of its flowing out through the discharge-pipe R into a receptacle.

In the operation of concentrating the fresh or raw sap into sirup, it is first received into the pan 1, and as it passes through the series of pans it becomes sirup in the last one of the series, and is discharged, as before described. By this means a uniform supply of sap to the first of the series of pans and the discharge of sirup from the last one of the series are continuous. The sap in any one of the pans of the series may be reduced to sirup by so closing the cocks as to confine the liquor in the pan until the water is evaporated by the heat from the furnace C and the sirup developed.

In finishing off, as before stated, there is usually a reduced quantity of sap or semi-sirup, and the conversion of this remaining amount is soon concentrated into sirup by returning or flowing it back through the series of pans and pipes in the manner before described.

The mechanism of Fig. 5, Sheet 2, represents the means employed for raising the pans from off the furnace and lowering them to the original place again upon the furnace, which consists in running a rope, S, over the pulley T. One end of this rope extends to and is attached to the pan at U, and the other end, V, hangs down within the reach of a person attending to the evaporating work. On pulling the cord at V the pan is raised up from off the furnace, as indicated in Fig. 4, while hinging and being supported on the brackets Q, and lowered or returned back upon the furnace on slacking up the said rope.

What I claim as my invention, and desire to secure by Letters Patent, is—

1. In combination, a suitable furnace, a series of independently-pivoted pans each provided with a guard or conductor, P, and conduit-pipes between the pans, said pipes serving as the pivots of the pans, substantially as described.

2. In combination, a suitable furnace, a series of pans arranged to be acted upon thereby, each being hinged or pivotally supported by jointed and movable conduit-pipes to have movement independent of the others, and a stop-cock in each conduit-pipe, substantially as described.

3. In combination, the furnace, the series of pans, the conduit-pipes arranged along one side of the pans, serving as pivots for the same and connecting one with the other, and the division-walls arranged in the pans between the openings of the pipes, said division-walls having openings for the passage of the liquid, said openings being located near that side of the pan opposite to that along which the pipes are located.

4. In combination, the furnace, a series of pivoted pans, the pipes for pivotally supporting and connecting the pans, said pipes having screw-threaded ends and a screw-threaded sleeve or coupling for connecting said pipes and allowing the pivotal movement, substantially as described.

In testimony whereof I affix my signature in presence of two witnesses.

WELLER S. GILMORE.

Witnesses:
W. H. BURRIDGE,
B. F. EIBLER.